UNITED STATES PATENT OFFICE.

MILLEDGE B. WEVER, OF SAN ANTONIO, FLORIDA.

METHOD OF PRESERVING FRUITS OR VEGETABLES.

SPECIFICATION forming part of Letters Patent No. 500,450, dated June 27, 1893.

Application filed September 16, 1892. Serial No. 446,100. (No specimens.)

*To all whom it may concern:*

Be it known that I, MILLEDGE B. WEVER, of San Antonio, in the county of Pasco and State of Florida, have invented a new and Improved Method of Preserving Fruits or Vegetables, of which the following is a full, clear, and exact description.

My invention relates to improvements in a method of preserving fruits or vegetables, and it is especially adapted for preserving the citrus fruits, such as oranges, lemons, limes and grape fruit, and also fruit and vegetables which contain a trace of silica, such as the apple, the cucumber, egg plant, &c.

The object of my invention is to provide a simple method by which such fruits or vegetables may be kept perfectly fresh for a long time so as to preserve their taste, smell and color.

To this end, my invention consists in a method which will be hereinafter described and claimed.

In carrying out my method, the fruit or vegetable to be preserved must be picked and handled with the greatest possible care, and instead of being pulled, the stem must be cut. The fruit is preserved in metallic or other boxes which are absolutely air tight, and for this purpose a tin box is preferable, having a tight fitting cover, but the size and form of the box does not matter. In packing, a layer of cotton lint is placed in the bottom of the box, this having been previously sprinkled lightly with an oil, preferably cotton seed oil. A layer of fruit is first placed carefully upon the oiled cotton, after which another layer of oiled cotton is placed upon the fruit, and the layers of cotton and fruit are alternated until the box is full, the top layer of fruit being covered with the cotton.

In packing the fruit, the cotton batting or lint is made to fit closely about the fruit so as to nearly or quite cover each particular fruit or vegetable. After the box is filled, the whole is covered by a thin sheet of india-rubber or a sheet of equivalent material which will make an absolutely tight seal. The cover is then placed upon the box and the latter kept in a cool place until the fruit is to be used. The box should have an orifice in one side, which may be opened and closed at will. By this means any excess of moisture generated soon after the fruit is packed, may be permitted to escape, after which the orifice may be closed by wax or any suitable seal. When the air is allowed to enter, the weather must be comparatively cool as otherwise the fruit may be injured. The fruit may be kept for a long time and when taken from the box will be found to have retained its color, taste and smell. When the fruit is taken from the box it may be wrapped in oiled paper and thus preserved for a short time so that it may be economically used or conveniently shipped. By packing the fruit or vegetable in an air tight box and in the oiled cotton as described, condensation is produced, and a vapor formed which permeates the cotton, mingles with the oil, and covers the fruit or vegetable so as to keep the rind in a pliable and moist condition, and when in this condition evaporation is prevented and the fruit preserved. This condensing action is also facilitated by the sheet of rubber on the top of the fruit.

Having thus described my invention, I claim as new and desire to secure by Letters Patent—

1. The herein-described method of preserving fruits and vegetables, which consists in packing the same in an air tight box between layers of oiled cotton batting.

2. The herein-described method of preserving fruits and vegetables, which consists in packing the fruit in an air tight box between layers of oiled cotton batting, and covering the mass in the box with a sheet of rubber.

MILLEDGE B. WEVER.

Witnesses:
R. A. BROWN,
W. A. JONES.